United States Patent
Yao et al.

(10) Patent No.: US 12,200,685 B2
(45) Date of Patent: Jan. 14, 2025

(54) MECHANISM FOR TB PROCESSING OVER MULTI-SLOT SCHEME

(71) Applicant: APPLE INC., Cupertino, CA (US)

(72) Inventors: Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Seyed Ali Akbar Fakoorian, San Diego, CA (US); Sigen Ye, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 138 days.

(21) Appl. No.: 17/593,420

(22) PCT Filed: May 11, 2021

(86) PCT No.: PCT/CN2021/093075
§ 371 (c)(1),
(2) Date: Sep. 17, 2021

(87) PCT Pub. No.: WO2022/236685
PCT Pub. Date: Nov. 17, 2022

(65) Prior Publication Data
US 2023/0319813 A1 Oct. 5, 2023

(51) Int. Cl.
*H04W 72/1263* (2023.01)
*H04W 72/0446* (2023.01)

(52) U.S. Cl.
CPC ... *H04W 72/1263* (2013.01); *H04W 72/0446* (2013.01)

(58) Field of Classification Search
CPC ......... H04W 72/1263; H04W 72/0446; H04Q 2213/13216; H04L 5/1469
See application file for complete search history.

(56) References Cited

U.S. PATENT DOCUMENTS

| | | |
|---|---|---|
| 2020/0304231 A1 | 9/2020 | Wu et al. |
| 2022/0303983 A1* | 9/2022 | Ly .............................. H04L 1/08 |
| 2022/0303988 A1* | 9/2022 | Yi .......................... H04L 1/1887 |

OTHER PUBLICATIONS

Nokia, Nokia Shanghai Bell, "Transport block processing for PUSCH coverage enhancements", R1-2103381, 3GPP TSG RAN WG1 #104-bis-e, e-Meeting 8.8.1.2, Apr. 12-20, 2021, 9 pages.
PCT/CN2021/093075, International Search Report and Written Opinion, Feb. 11, 2022, 9 pages.

(Continued)

*Primary Examiner* — Marisol Figueroa
(74) *Attorney, Agent, or Firm* — Dorsey & Whitney LLP

(57) ABSTRACT

The present disclosure proposes configuration for TB processing over multi-slot, particularly Transmission Block over multi-slot (TBoMS) transmission. Specifically, such configuration for TBoMS may relate to at least one of size determination for TBoMS, scheduling for TBoMS transmission, resources determination and allocation for TBoMS transmission, and so on, and corresponding information related to such configuration can be acquired, set or determined appropriately, so that the TB processing over multi-slot can be performed accordingly.

14 Claims, 12 Drawing Sheets acquire configuration information about Transmission Block over Multiple time-domain Resources (TBoMR)
702 perform at least TBoMR transmission over time domain resources based on the configuration information
704

(56) References Cited

OTHER PUBLICATIONS

Xiaomi, "TB processing over multi-slot PUSCH", R1-2102993, 3GPP TSG RAN WG1 #104b-e, e-Meeting, Agenda Item 8.8.1.2, Apr. 12-20, 2021, 5 pages.
Ericsson, "TB Processing over Multi-Slot Pusch", R1-2103445, 3GPP TSG-RAN WG1 Meeting #104b-e, e-Meeting, Agenda Item 8.8.1.2, Apr. 12-Apr. 20, 2021, 17 pages.
Samsung, "TB processing over multi-slot PUSCH", R1-2103252, 3GPP TSG RAN WG1 #104b-e, e-Meeting, Agenda Item 8.8.1.2, Apr. 12-20, 2021, 8 pages.

\* cited by examiner (a)

(b)

(a)

(b)

(c)

(a)

(b)

(a)

(b)

(c)

(a)

(b)

(a)

(b)

(a)

(b)

(a)

(b)

(a)

(b)

(c)

MECHANISM FOR TB PROCESSING OVER MULTI-SLOT SCHEME

FIELD

The present application relates to transmission over time slot, and more particularly to apparatus, systems, and methods for improved transmission over time slot.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments of the present disclosure relate to provide improved transmission over time slot, particularly Transmission Block (TB) processing over multiple time slots.

In one aspect, the present disclosure proposes configuration for TB processing over multi-slot, particularly Transmission Block over multi-slot (TBoMS) transmission. Specifically, such configuration for TBoMS may relate to at least one of size determination for TBoMS, scheduling for TBoMS transmission, resources determination and allocation for TBoMS transmission, and so on, and corresponding information related to such configuration can be acquired, set or determined appropriately, so that the TB processing over multi-slot can be performed accordingly.

Comparing with the single slot transmission with same target data rate, it could provide the power boosting gain. Modulated symbols can be mapped over multiple resources in the time domain to ensure a higher spectral density. In addition, comparing with the time domain repetition, it could get the benefits of lower coding rate and less-CRC padding for small data packet.

In another aspect, the present disclosure proposes reliability improvement for TB processing over multi-slot. In particular, the TB processing over multi-slot can be performed along with other appropriate mechanisms for improving the reliability of the TB processing over multi-slot.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
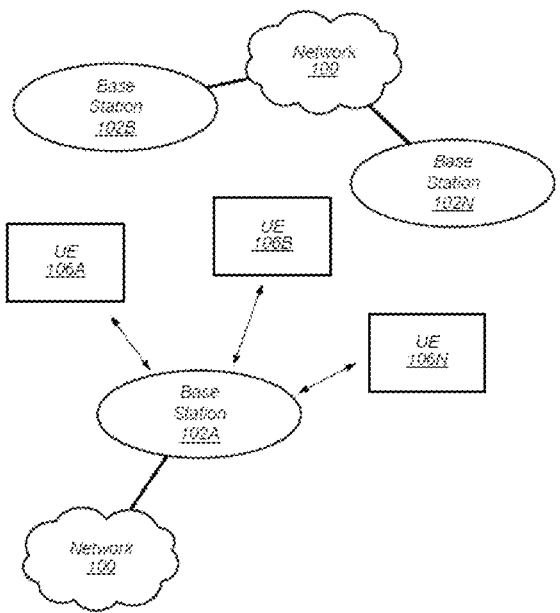
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Network-side Device—any of various types of computer systems or devices that perform communications, particularly perform wireless communication with the wireless device, such as downlink communication to the wireless device related to downlink transmission. The network-side device can be portable (or mobile) or may be stationary or fixed at a certain location. A base station is an example of a network-side device.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
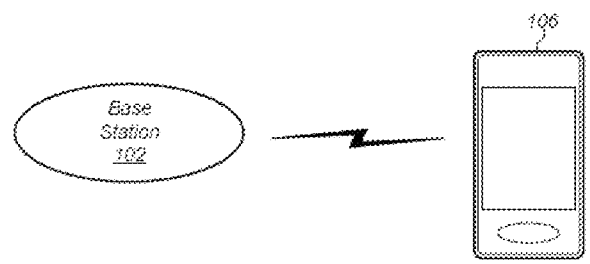
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1xRTT, or either of LTE or GSM, among various possibilities), and separate radios for communicating using each of Wi-Fi and Bluetooth. Other configurations are also possible.

Figure 3:
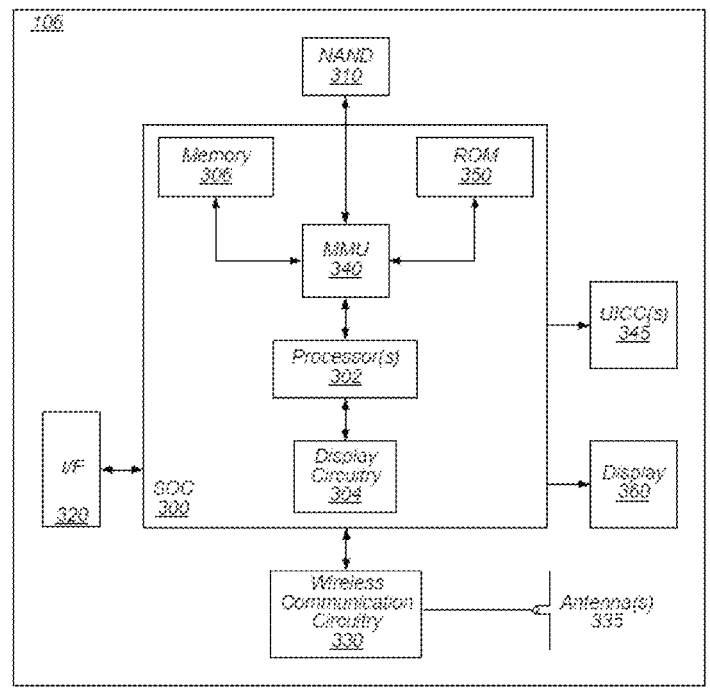
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
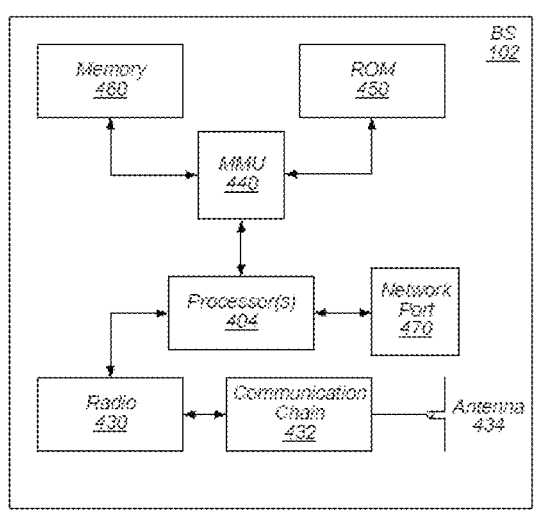
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
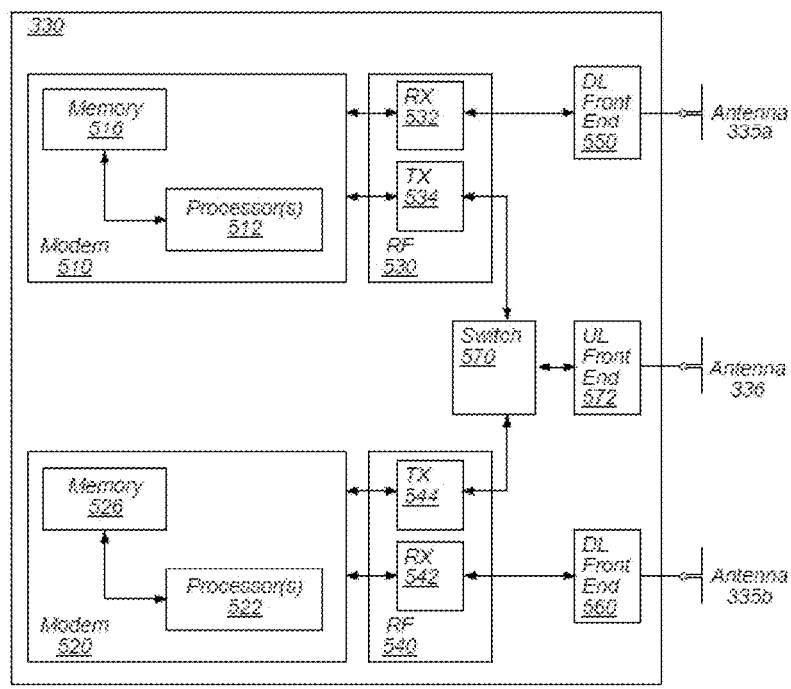
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs)

that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
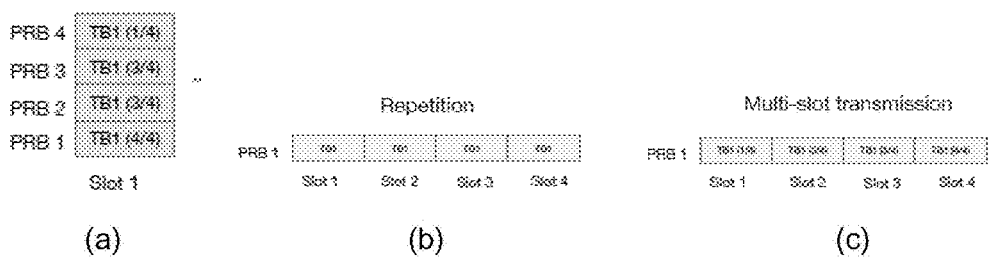
FIG. 6 illustrates schematic diagrams for TB transmission over single-slot transmission, TB repetition transmission, and TB transmission over multi-slot transmission.

FIGS. 6-7 TB transmission over multi-slot

New cellular communication techniques are continually under development, to increase coverage, to better serve the range of demands and use cases, and for a variety of other reasons. One technique that is currently under development may include NR coverage enhancement, and some potential solutions for coverage enhancement are being studied. Particularly, the target channels may include at least PUSCH/PUCCH, and some enhanced solutions, e.g., time domain/frequency domain/DM-RS enhancement (including DM-RS-less transmissions), and some additional enhanced solutions for FR2 if any, etc. are studied. And the performance of the potential solutions can be evaluated based on link level simulation.

Currently, improvement for Transmission Block (TB) processing is being studied for NR coverage enhancement. Traditionally, one TB (transmission block) is transmitted on single slot, and at least one Physical Resource Block may be utilized, as schematically shown in FIG. 6(*a*). However, such transmission may cause lower spectral density. In addition, the TB transmission can be performed in a manner of time domain repetition, wherein the same TB is repeated on multiple slots, as schematically shown in FIG. 6(*b*). Although such repetition can enhance data reliability, the coding rate may be influenced adversely to some extent.

Therefore, in the present disclosure, there provides a solution of TB processing over multi-slot, and particularly, one TB could be transmitted over several slots. As schematically shown in FIG. 6(*c*), one TB can be divided into multiple segments, and each segment can be allocated into a slot for processing, such as transmission, and the multiple segments may have the same or different sizes. For example, a segment can be a part of the TB, even the whole of the TB, that is, such TB over multi-slot can be combined with repetition. In an example, for TB over 4 slots, there may exist two or three slots for one TB, and the remaining slots for one TB.

Comparing with the single slot transmission with same target data rate, it could provide the power boosting gain. Modulated symbols can be mapped over multiple resources in the time domain to ensure a higher spectral density. And comparing with the time domain repetition, it could get the benefits of lower coding rate and less-CRC padding for small data packet.

Figure 7A:
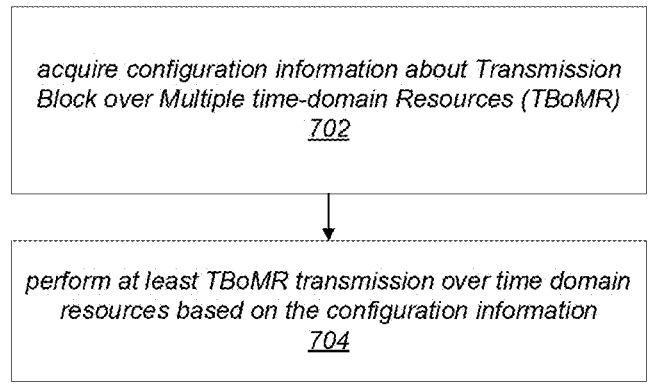
FIGS. 7A and 7B illustrate flowchart diagrams illustrating example methods for performing TB processing over multi-slot based on configuration information about TBoMS, according to some embodiments.
Figure 7B:
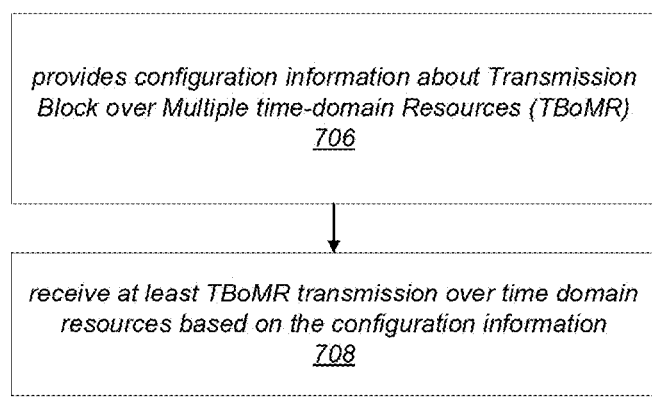

Hereinafter some embodiments of the present disclosure related to TB processing over multiple time domain resources will be described with reference to figures. FIGS. 7A and 7B illustrate flowchart diagram illustrating example methods for performing TB processing over multi-slot based on configuration information about TBoMS, according to some embodiments.

Aspects of the method of FIG. 7A may be implemented by a wireless device such as a UE 106 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. In various embodiments, some of the elements of the methods shown may be performed concurrently, in a different order than shown, may be substituted for by other method elements, or may be omitted. Additional elements may also be performed as desired.

As shown, the method of FIG. 7A may operate as follows. At 702, the wireless device acquires configuration information about Transmission Block over Multiple time-domain Resources (TBoMR). In particular, the configuration information may include at least one selected from a group comprising size information, resource allocation information, scheduling information, TB content arrangement information and any other appropriate information about TBoMR. At 704, the wireless device performs TBoMR transmission over time domain resources based on the configuration information. Thus, the method of FIG. 7A may be used by a wireless device, such as a UE, to implemented TBoMS transmission and achieve transmission improvement, at least according to some embodiments.

FIG. 7B may be implemented by a network-side device for example a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. In various embodiments, some of the elements of the methods shown may be performed concurrently, in a different order than shown, may be substituted for by other method elements, or may be omitted. Additional elements may also be performed as desired.

As shown, the method of FIG. 7B may operate as follows. At 706, the network device provides configuration information about Transmission Block over Multiple time-domain Resources (TBoMR), such as to a wireless device. In particular, the configuration information may include at least one selected from a group comprising size information, resource allocation information, scheduling information, TB content arrangement information and any other appropriate information about TBoMR. At 708, the network device receive TBoMR transmission over time domain resources based on the configuration information. Thus, the method of FIG. 7B may be used by a network device, such as a Base station, to implemented TBoMS transmission and achieve transmission improvement, at least according to some embodiments.

Note that the entity for implementing the method in FIGS. 7A and 7B can be exchanged with each other. For example, the method in FIG. 7A can be implemented by a network-side device and the method in FIG. 7B can be implemented by a wireless device, so that an improved TBoMS transmission, particularly DL TBoMS transmission, can be achieved.

According to some embodiments, the size information may include Transmission Block Size (TBS) information, which may indicate the size of TB(s) to be processed, or may indicate the size of time-domain resources occupied by one TB to be processed, such as Transmission Occasion (TO) as described hereinafter.

According to some embodiments, the resource allocation information may indicate time-domain resource allocation for TBoMR. In an example, the information may include at least one of information about time-domain resources scheduled for TBoMR, information about time-domain resources available for TBoMR, information about the number of time-domain resources available for one TB, information whether a specific time-domain is available for TB transmission, and so on.

According to some embodiments, the scheduling information may including processing mode information indicating how the TBs are to be processed, such as transmitted, over multiple time domain resources. For example, the processing mode information may include at least one of information about transmission mode of TBs, information about whether re-transmission of TBs is to be implemented, information about re-transmission mode of TBs, information about whether non-consecutive transmission or consecutive transmission is to be implemented, information about whether remaining time-domain resources are available for TB transmission, and so on.

According to some embodiments, the TB content arrangement information may include at least information about arrangement of specific TB contents, such as DRMS, in the time-domain resources.

Note that the time domain resource can be in any appropriate form. For example, the time domain resource can include a time slot, symbols included in a time slot, or any appropriate time-domain resource. Hereinafter, the time slot and/or symbols will be taken as an example of the time domain resource to describe the TB processing over multiple time domain resources, and Transmission Block over Multi-slot (TBoMS) can be an example of Transmission Block over Multiple time-domain Resources (TBoMR).

According to some embodiments of the present disclosure, the configuration information for TBoMS transmission can be indicated in any appropriate manner. In particularly, the configuration information can be indicated statically, semi-static or dynamically.

In an embodiment, the static or semi-static indication can be implemented via the RRC signaling, such as defining some new RRC parameters indicating the configuration information, for example transmissionOccasion as an example of the size information, ConsecutiveTBoMS, numberOfTO as examples of the processing mode information, totalSlotforTB as an example of the allocation information.

In another embodiment, the indication may belong to dynamic indication. In an example, the dynamic indication can be implemented via the MAC CE. In another example, the dynamic indication can be implemented via UL DCI. For example, a new field "TBoMS transmission" can be introduced in UL DCI, which can include sub-fields related to the configuration information, such as the combination of consecutiveTBoMS, totalSlotforTB, transmissionOccasion, numberOfTO sub-fields. The field "TBoMS transmission" can be configurable as any appropriate form with any appropriate size, such as bits corresponding to each of the configuration information. In another example, fields related to the configuration information, such as consecutiveTBoMS, totalSlotforTB, transmissionOccasion, numberOfTO fields, can be introduced in TDRA table, currently TDRA table includes the fields of k2, MappingType, startSymbolAndLength. Introduce new entries for TDRA table to support larger slot number for TBoMS transmission, such as entries increase from 16 (Rel.15) to 64.

As an example, such introduction may impact some related specification for TB transmission, such as 38.331 spec, and the impacts for 38.331 spec caused by such introduction is shown below. The initial contents are as follows. Note that the parameter in a form of "n+integer" for numberofRepetition may mean the number of transmission repetition, for example, n1 means just transmission one time. n2 means repetition twice; n8 means repetition the transmission 8 times, and so on.

```
PUSCH-TimeDomainResourceAllocationList : := SEQUENCE
(SIZE(1..maxNrofUL-
Allocations)) OF PUSCH-TimeDomainResourceAllocation
PUSCH-TimeDomainResourceAllocationList : := SEQUENCE {
k2 INTEGER(0..32) OPTIONAL, -- Need S
mappingType ENUMERATED {typeA, typeB},
startSymbolAndLength INTEGER (0..127)
numberOfRepetitions ENUMERATED {n1, n2, n3, n4, n7, n8, n12, n16}
OPTIONAL
}
```

The contents after introduction of new fields are as follows:

```
PUSCH-TimeDomainResourceAllocationList-r17 : := SEQUENCE
(SIZE(1..maxNrofUL-
Allocations-r17)) OF PUSCH-TimeDomainResourceAllocationList-r17
PUSCH-AllocationList-r17 : := SEQUENCE {
k2 INTEGER(0..32) OPTIONAL, -- Need S
mapping Type ENUMERATED {typeA-like, typeB-like},
startSymbolAndLength INTEGER (0..127)
consecutiveTBoMS BOOLEAN
totalSlotforTB ENUMERATED {n1, n2, n3, n4, n7, n8, n12, n16, n32} OPTIONAL,
transmissionOccassion ENUMERATED {n1, n2, n3, n4, n7, n8, n12, n16} OPTIONAL,
numberOfTO ENUMERATED {n1, n2, n3, n4 } OPTIONAL,
}
```

Note that in the contents after introduction of such new fields, the parameter in a form of "n+integer" for respective fields may actually mean the parameter/value of the field is the integer. For example, n1, n2, . . . n32 just means the number is 1, 2, . . . , 32. Specially, for totalSlotforTB field, it means total number of slot that is used for TBomS, for field of transmisisonOccasion, it means how many slot is included in one TO, and for the field of numberOfTO, it means how many TOs are assigned for a TBoMS.

According to some embodiments, the configuration information may include Transmission Block Size (TBS) related information, for example, the TB size or other information available for determination of TB size, and the wireless device may perform the TBoMR transmission over at least time-domain resources based on the TBS information. In particular, TB size can be determined/set by any appropriate entity. For example, TB size need to be determined by UE and the same assumption should be applied to gNB as well.

In an embodiment, the TB size information may include information related to TBs to be transmitted, which, particularly, can be preset, determined according to transmission condition. In an example, TBS is determined by information bits, the Number of information bits per slot $N_{info}=N_{RE}*R*Q_m*v*T$, where $N_{RE}$ is resources per slot, R is coding rate of TBs, $Q_m$ is the modulation order, v is the MIMO layer and is equal to 1 for TBoMS, T is the time duration of a slot.

According to some embodiments, the TBoMS processing, such as TBoMS transmission, may be implemented under some limitation, so that TBoMS shall be configured under the limitation, that is, the TB size shall be influenced by such limitation. For example, the limitation information may be included in the configuration information.

In an embodiment, the limitation may relate to Physical Resource Block (PRB), and thus the TBoMS shall be configured under the PRB limitation. The PRB number would impact the UE buffering the data from multiple slots, limiting the PRB number would be friendly to UE implementation. Such PRB limitation can be set by any appropriate entity, such as UE or gNB, and can be set in any appropriate manner. In an embodiment, the maximum PRB number for TBoMS can be fixed in the specification, such as 30 PRBs for data transmission, 4 PRBs for VoIP. In another embodiment, UE can report the capability to support the maximum PRBs for TBoMS, and gNB scheduled PRBs for TBoMS would be smaller or equal to the reported PRB numbers.

In yet another embodiment, the limitation may relate to TBS. Such TBS limitation can be set by any appropriate entity, such as UE or gNB, and can be set in any appropriate manner. For example, there may exist Fixed TBS (s) which can be fixed in the spec or indicated by RRC signaling and serves as the TBS limitation, the determined TBS by Modulation and Coding Scheme (MCS), PRBs and slots should not be larger than the fixed TBS. In particular, UE does not expect the TBS is larger than TBS cap for TBoMS. If several TBSs limitations are defined, UE reports the TBS limitation capability. For example, the parameters for TBS determination can be adjusted based on the TBS limitation so that the determined TBS, such as described above, can be smaller than the TBS limitation.

In an example, up to 3840 bits defined in LDPC base graph 2, which means only one TB will be transmitted without CB segmentation, thus it's up to gNB scheduling on MCS, PRBs with the TBS limitation. In another example, TBoMS capable UE can support the low spectrum efficiency MCS Table by default, i.e., qam64LowSE MCS Table, and the information about the limitation may be included in the Table.

According to some embodiments, the TB size may include the size of one TB, which, for example, may be represented by the number of time-domain resources for transmission of one TB. In an example, the TB size can be determined based on the number of time-domain resources in a Transmission Occasion (TO) for the TBoMR transmission. For example, the Transmission occasion (TO) may include a number of slots to transmit one TB, and thus the TB size is determined according to the number of slots in a TO.

Figure 8:
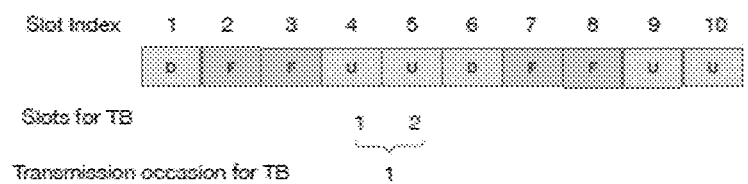
FIG. 8 illustrates schematic diagrams of transmission occasions in cases of consecutive transmission and non-consecutive transmission.
Figure 8:
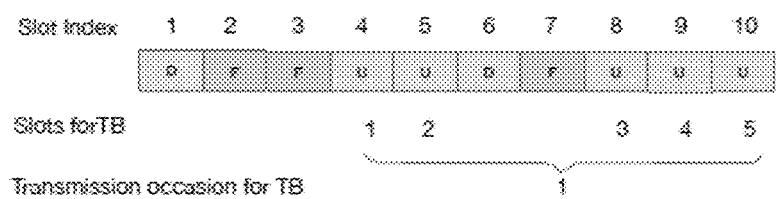

According to some embodiments, the Transmission Occasion (TO) may include at least one of consecutive time-domain resources and non-consecutive time-domain resources. In an example, in a case that consecutive transmission is enabled for TBoMS, for example, consecutive physical slots for UL transmission can be used for TBoMS, one TB will compete the transmission in consecutive slots. And in such a case, a Transmission Occasion (TO) may include consecutive time slots, whose number may usually be smaller than or equal to the number of consecutive time slots available for TBoMS transmission, as shown in FIG. 8(a). In another example, in a case that non-consecutive transmission is enabled for TBoMS, for example, non-consecutive physical slots for UL transmission can be used for TBoMS, one TB can be transmitted over non-consecutive slots. And in such a case, a Transmission Occasion (TO) may include non-consecutive time slots, or both consecutive time slots or non-consecutive time slot, whose number shall be small than time slots available for TBoMS transmission, as shown in FIG. 8(b).

According to some embodiment, the information about TO, such as, the number of slots in a TO, can be set in any appropriate manner. In an example, the TO may be pre-set under transmission requirement, transmission channel condition, etc. In another example, the TO can be set in consideration of available slots for TBoMS. For example, when there exits only one pattern for UL/DL TDD configuration, wherein at least one set of consecutive slots with the same number of slots can be included, TO may be smaller than or equal to each set of consecutive slots for TBoMS transmission. For example, when exits two or more patterns for UL/DL TDD configuration, wherein at least one set of consecutive slots with the same number of slots can be included in each pattern, and the number of consecutive slots in one pattern may be different from that in another pattern, TO may be smaller than or equal to the consecutive slots with the maximum slot number in the two or more patterns. For example, TO may be smaller than or equal to the consecutive slots with the minimum slot number in the two or more patterns, or TO may be larger than the consecutive slots with the minimum slot number in the two or more patterns.

According to some embodiments, the resource allocation information may indicate the time-domain resources, such as slots, scheduled for TBoMS transmission, and it shall be larger than the slots for Transmission of the one TB, such as TO described above. And particularly, the information about TO, such as number of slots in TO, may be included in such information. Such scheduled slots may include consecutive slots and/or non-consecutive slots, and may be based on the patterns for UL/DL TDD configuration.

According to some embodiments, the Time-Domain Resource Allocation (TDRA) for TBoMS can be implemented in consideration with a specific repetition type, whose information may also be included in the resource allocation and/or scheduling information. For example, there may exist two repetition types for time domain resource determination for TBoMS, and the two repetition types may include a first repetition type (Repetition Type-A) and a second repetition type (Repetition Type-B). Note that the repetition type A or type B doesn't mean there is repetition for TBoMS, it just reuses the similar TDRA method of repetition type A or type B to determine the time domain resource for TBoMS. In the repetition type A like TDRA, the number of allocated symbols is the same in each slot. And in the repetition type B like TDRA, the number of allocated symbols in each slot can be different.

In an embodiment, the repetition type information can be indicated in any appropriate manner, such as statically or dynamically. For example, the information can be indicated by Rel.15 parameter pusch-AggregationFactor in semi-static manner, or can be indicated by Rel.16 parameter numberOfRepetition in dynamic manner.

In an embodiment, the repetition type information can indicate the repetition counting in the time-domain resources. In an example, based on consecutive slot, all the slots are counted as TBoMB resource, even the slot is DL slot. In another example, based on available slot/symbol, and for Repetition type A-like TDRA, the repetition counting is based on available slots, i.e., only valid UL slots are counted as the repetition, and for Repetition type B-like TDRA, the repetition counting is based on available symbols i.e., only valid UL symbols are counted as the repetition.

According to some embodiments of the present disclosure, the configuration information may include information indicating whether a specific time-domain is available for TB transmission, for example, whether a special slot is available for TBoMS transmission. If transmission on special slot is allowed, the REs in special slot are used for TBS determination. According to some embodiments, if two TDD UL/DL patterns are configured, the special slot can be disabled/enabled separately for TBoMS transmission.

Such indication whether special slot can be used for TBoMS transmission can be presented in any appropriate manner, such as explicitly or implicitly.

In one embodiment, explicit indication can be implemented via RRC signaling whether special slot is used for transmission. In another embodiment, implicit indication can be implemented via resource allocation. For example, if TDRA TypeA-like resource determination is applied, then special slot is not allowed for TBoMS transmission. If TDRA TypeB-like resource determination is applied, the special slot is used for TBoMS transmission. In yet another embodiment, dynamic indication can be implemented via DCI. In an example, new field is introduced in DCI to indicate whether special slot is applied, such as a binary-value indication for 1 bit indication. In another example, new field is introduced in TDRA table to indicate whether special slot is applied. Note that the above embodiments can be combined in any appropriate manner. For example, such indication can be implemented via combination of RRC signaling and resource allocation type, and the such indication can include at least one of the following: Case 1: RRC disables the special slot transmission, then transmission on special slot is not allowed; Case 2: RRC enable transmission+type A-like resource determination, then transmission on special slot is allowed; Case 3: RRC enable transmission+type B-like resource determination, then transmission on special slot is allowed In an example, gNB can configure the DMRS-less transmission in special slot, i.e., no DMRS in special slot, the available REs are used for data transmission, while UE assume the same transmission power in the special slot and following UL slot, and the phase continuity is kept. And Joint channel estimation in special slot and UL slot can be performed from gNB side.

According to some embodiments, the configuration information may include information indicating whether consecutive transmission or non-consecutive transmission may be enabled for TBoMS. Consecutive transmission may mean one TB will compete the transmission in consecutive slots, such as consecutive physical UL slots, and non-consecutive transmission may mean one TB can be transmitted over the non-consecutive slots, as shown in FIGS. 8(a) and (b). Such information may be presented in any appropriate manner, for example, may be represented by an indicator, field such as ConsecutiveTBoMS described above, etc. and may be a binary value, wherein one value indicates consecutive transmission and the other value indicates non-consecutive transmission. The slot transmission capability can be indicated or reported by any appropriate manner, and/or can be indicated or reported by any appropriate entity in the system. For example, UE reports the capability whether support non-consecutive slots transmission for TBoMS. The proposed scheme is applied to both dynamic grant scheduled TBoMS and configured grant scheduled TBoMS.

According to some embodiments, the configuration information may include transmission mode information which indicates the mode for first transmission of TBs. For UE with the capability of TBoMS and repetition, indication of first transmission can be TBoMS or Repetition or joint operation of TBoMS and Repetition. The transmission mode information can be indicated in any appropriate manner, such as statically or dynamically, and the indication of the transmission mode can be applied to dynamic grant scheduled TBoMS and configured grant scheduled TBoMS (including CG type 1 and CG type 2).

In an embodiment, the transmission mode information is statically indicated. In an example, RRC signalling indicates which transmission mode is applied, then UE selects the corresponding TDRA table. Several TDRA tables are configured. PUSCH-TimeDomainResourceAllocationList or PUSCH-TimeDomainResourceAllocationList-r16 is configured for repetition. PUSCH-TimeDomainResourceAllocationList-r17 is configured for TBoMS transmission.

In another embodiment, the transmission mode information can be indicated dynamically. For example, dynamic indication is implemented via MACE CE or via DCI. In an example, a new field can be introduced in UL DCI, e.g., 1 bit to differentiate the Repetition or TBoMS. In another example, existing field in the UL DCI can be re-interpreted to indicate the transmission mode. And note that similar with the statical indication, for such examples, several TDRA tables are configured.

In yet another example, the transmission mode information can be indicated implicitly by the entry of the TDRA table, the bit number of TDRA field in UL DCI could be extend to 7 bits. With this solution, only one TDRA table is configured. For example, if the field of numberOfRepetition is appropriately configured, then repetition can be applied. Otherwise, if TBoMS related fields are present, then TBoMS transmission is applied. The fields could be like "consecutiveTBoMS," "totalSlotforTB," "transmissionOccasion," "numberOfTO." If the value of field numberOfRepetition or totalSlotforTB is n1 which may mean just transmission one time, then single slot transmission is applied. The configured TDRA table is as follows. Note that the parameter in a form of "n+integer" may have the similar meaning as described above.

```
PUSCH-TimeDomainResourceAllocationList-r17 ::= SEQUENCE
  (SIZE(1..maxNrofUL-
Allocations-r17)) OF PUSCH-TimeDomainResourceAllocation-r17
  PUSCH-Allocation-r17::= SEQUENCE {
  k2 INTEGER(0..32) OPTIONAL, -- Need S
  mappingType ENUMERATED {typeA-like, typeB-like},
  startSymbolAndLength INTEGER (0..127)
  numberofRepetitions ENUMERATED (n1, n2, n3, n4, n7, n8,
  n12, 16) OPTIONAL
  consecutiveTBoMS  BOOLEAN
  totalSlotforTB  ENUMERATED {n1, n2, n3, n4, n7, n8, n12,
  n16, n32} OPTIONAL,
  transmissionOccasion ENUMERATED {n1, n2, n3, n4, n7, n8,
  n12, n16} OPTIONAL, numberOfTO ENUMERATED {n1, n2, n3, n4,} OPTIONAL,
  }
```

In yet another example, the transmission mode information can be indicated explicitly by the entry of the TDRA table. For example, introducing one new field in the TDRA table to indicate the transmission mode, the bit number of TDRA field in UL DCI could be extend to 7 bits. The example is showing below, a field of TBoMS are introduced to indicate the TBoMS transmission.

If TBoMS is configured with 0, then repetition only is applied. For CG based TBoMS if numberOfRepetition is not configured, it is replaced by parameter repK. If TBoMS is configured with 1, then TBoMS is applied. If the value of field numberOfRepetition or totalSlotforTB is n1, then single slot transmission is applied. The configured TDRA table is as follows. Note that the parameter in a form of "n+integer" may have the similar meaning as described above.

```
PUSCH-TimeDomainResourceAllocationList-r17 ::= SEQUENCE
(SIZE(1..maxNrofUL-
Allocations-r17)) OF PUSCH-TimeDomainResourceAllocation-r17
  PUSCH-Allocation-r17::= SEQUENCE {
  k2 INTEGER(0..32) OPTIONAL, -- Need S
  mappingType ENUMERATED {typeA-like, typeB-like},
  startSymbolAndLength INTEGER (0..127)
  numberofRepetitions ENUMERATED (n1, n2, n3, n4, n7, n8, n12,
  16) OPTIONAL
  TBoMS ENUMERATED {0, 1}
  consecutiveTBoMS  BOOLEAN
  totalSlotforTB  ENUMERATED {n1, n2, n3, n4, n7, n8, n12,
  n16, n32} OPTIONAL,
  transmissionOccasion ENUMERATED {n1, n2, n3, n4, n7, n8,
  n12, n16} OPTIONAL,
  numberOfTO ENUMERATED {n1, n2, n3, n4,} OPTIONAL,
  }
```

According to some embodiments, the configuration information may include information indicating whether re-transmission of TB will be performed, that is, after the first transmission, whether the first transmission or its part may be re-transmitted. Such re-transmission information may be presented in any appropriate manner, such as explicitly or implicitly. In an example, such information may be represented by an indicator which may be a binary value, wherein one value indicates re-transmission is enabled and the other value indicates re-transmission is not implemented. In another example, usually, when the slots scheduled for/available for TBoMs is larger than a TO, the re-transmission can be performed. Such re-transmission may relate to at least one of TO re-transmission and slot re-transmission. Therefore, whether the slots scheduled for/available for TBoMs is larger than a TO can implicitly indicate whether re-transmission is to be implemented, without explicit indication by an indicator. Preferably, when re-transmission is not implemented, the first transmission shall be TBoMS transmission. And aiming to reliability enhancement, re-transmission is preferably implemented.

According to some embodiments of the present disclosure, the configuration information may include retransmission mode information indicates how the retransmission of TBs is to be implemented. Such retransmission mode information can be presented in any appropriate manners, such as explicitly or implicitly. For example, explicit indication of re-transmission mode via 1 bit in DCI or MAC CE. In another example, implicit indication by the entry of the TDRA table as the first transmission. Note that such retransmission mode information can coexist with or replace the information about whether the retransmission is intended to be implemented. For example, when the retransmission mode has been set, which implicitly means the retransmission is intended to be implemented, the information about whether the retransmission is intended to be implemented can be omitted.

The retransmission can be performed in any appropriate manner. For example, for UE with the capability of TBoMS and repetition, indication of re-transmission is TBoMS or Repetition. TBoMS re-transmission scheme can be applied both DG and CG scheduled TBoMS. Preferably, in the first transmission and at least one retransmission, at least one TBoMS transmission is implemented.

In an embodiment, the same transmission mode as the first transmission can be utilized, i.e., if the first transmission is repetition, then the re-transmission is still repetition; if the first transmission is TBoMS, then the re-transmission is TBoMS as well.

In an embodiment, the TB transmission in the first TO can be repeated in the subsequent TOs in the same manner, for example, the TB distribution in the subsequent TOs may be the same as that in the first TO. And the TB transmission in respective TOs may be provided with corresponding Redundancy Versions (RV), wherein the RV can be set in accordance with a specific RV sequence. For example, the TB transmission in the respective TOs may be different from each other. In another embodiment, the TB transmission in the first TO can be repeated in the subsequent TOs in a different manner, for example, the TB distribution in the subsequent TOs may be the different from that in the first TO. For example, when the number of slots in respective TO is the same, the portion of TB in each slot in subsequent TOs may be different from that in the previous TO. In yet another example, the number of slots in subsequent TOs may be different from that in the previous TOs.

According to some embodiments, the information about re-transmission, such as the times of re-transmission which may correspond to the count of TOs, can be determined based on some appropriate information, instead of being indicated explicitly.

Figure 9:
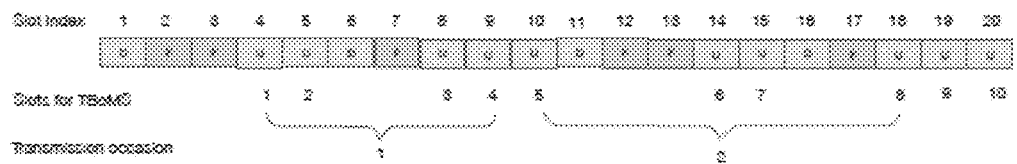
FIG. 9 illustrates schematic diagrams of count information of transmission occasions in cases of consecutive transmission and non-consecutive transmission.
Figure 9:
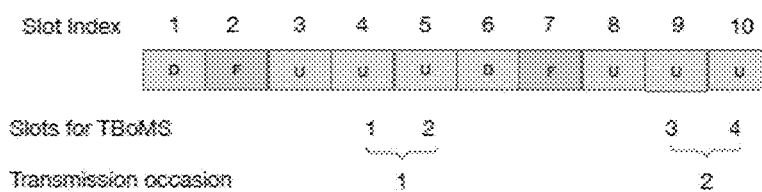
Figure 9:
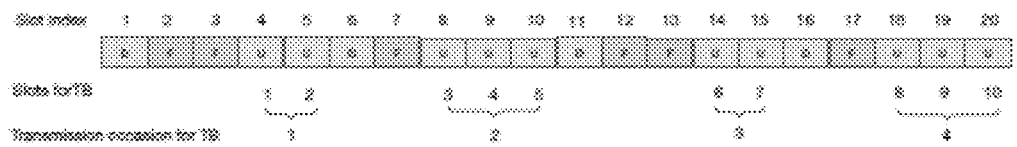

In one embodiment, the configuration information includes information about the time-domain resources scheduled for the TBoMR transmission, and the count of TOs can be determined based on the number of scheduled time-domain resources and the number of time-domain resources in a TO. In an example, the count of TOs can be determined by rounding the ratio of the number of scheduled time-domain resources and the number of time-domain resources in a TO. As shown in FIG. 9(a), there may exist two TOs for TBoMS transmission. Note that such determination may be particularly suitable for non-consecutive transmission.

In another embodiment, the configuration information includes information about available time-domain resources, and wherein the number of TOs is determined based on the number of available time-domain resources and the number of time-domain resources in a TO. The available time-domain resources may be the same as the scheduled resources, particularly in the non-consecutive transmission, and may be somewhat different from the scheduled resources, for example, may be consecutive slots particularly in the consecutive transmission. Note that the smaller one in the scheduled slots and consecutive slots shall be utilized for determining TO counts. For example, when the scheduled slots are not larger than consecutive slots, the scheduled slots will be utilized, and when the scheduled slots are larger than consecutive slots, the consecutive slots will be utilized. For example, information about such available slots, particularly information about consecutive slots, such as the number of sets of consecutive slots, the number of slots in each set, etc. can also be included in the configuration information.

According to one embodiment, the configuration information includes information about the number of sets of consecutive time-domain resources and the number of time-domain resources in each set, and wherein the number of TOs is determined by rounding the ratio of the number of time-domain resources in each set and the number of time-domain resources in a TO and summing the rounded ratios. As shown in FIG. 9(b), there may exist two TOs for TBoMS transmission determined based on consecutive slots.

According to one embodiment, the re-transmission can be implemented via TOs with different consecutive slots, and in such a case, mapping of TBs shall be implemented. In particular, the configuration information includes information about the number of sets of consecutive time-domain resources and the number of time-domain resources in each set, and wherein the number of TOs corresponds to the number of sets of consecutive time-domain resources, and the wireless device is further configured to perform the TBoMR transmission by mapping of coded bits of TBs into any set of consecutive time-domain resources whose number is different from the number of time-domain resources in the TO. As shown in FIG. 9(c), there may exist four TOs for TBoMS transmission, According to some embodiments, the mapping can be performed in any appropriate manner. For example, coded bits in TOs with smaller number of slots can be mapped to a TO with larger number of slots with zero padding or information bits of following RV. For example, coded bits in TOs with larger number of slots can be mapped to a TO with smaller number of slots with rate compression.

According to some embodiments, the information about re-transmission or repetition may include information indicating whether remaining time-domain resources included in time-domain resources scheduled for the TBoMR transmission other than the TO are available for the TBoMR transmission, and the wireless device is further configured to perform the TBoMR transmission based on the information. The information indicating whether remaining time-domain resources are available for the TBoMR transmission can be presented in any appropriate form. For example, the information may be one-bit indicator of binary value, wherein one value indicates available and the other value indicates non-available. In one embodiment, the information can be set/determined by any appropriate entity. For example, the information can be configured by gNB. According to one embodiment, when there may exist two or more patterns configured for UL/DL TDD configuration, for each pattern, a corresponding information for each pattern may be configured.

According to some embodiments, when the remaining time domain resources are not utilized to TBoMR transmission, such remaining time domain resources will be skipped or ignored. According to some embodiments, when the information indicates the remaining time-domain resources are available for the TBoMR transmission, the wireless device is further configured to perform the TBoMR transmission by utilizing the remaining time-domain resources to repeat the transmission of TB in previous specific time-domain resources. In an example, the remaining slots can repeat the transmission of TB in previous slot with the corresponding serial number.

Figure 10:
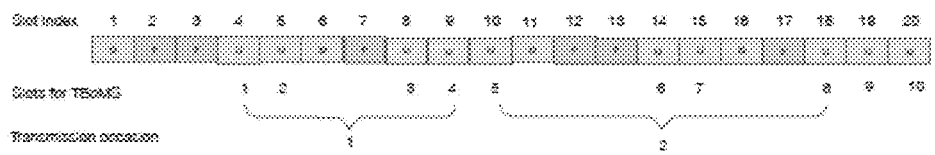
FIG. 10 illustrates schematic diagrams of remaining slots in case of consecutive transmission and non-consecutive transmission.
Figure 10:
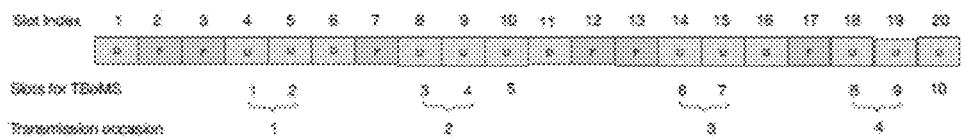

In an example, when the scheduled slots exceed one or more TOs, the remaining slots #9, #10, may belong to the remaining slots, as shown in FIG. 10(a). In another example, the remaining time-domain resources include remaining time-domain resources in a set of consecutive time-domain resources other than the TO. Such case is particularly suitable for the consecutive transmission. For example, when a set of consecutive slots exceeds one or more TOs, the remaining slots #5, #10 may belong to the remaining slots, as shown in FIG. 10(b).

Hereinafter some examples related to TBoMS transmission based on allocation or scheduling of time domain resources, such as slots, will be described. In such a case, for simplicity, the TBoMS transmission is intended to be performed without considering usage of other transmission modes, such as repetition or combination of TBoMS and repetition, but note that other transmission modes can be applied into the examples similarly, and the object of the present disclosure still can be reached.

Figure 11:
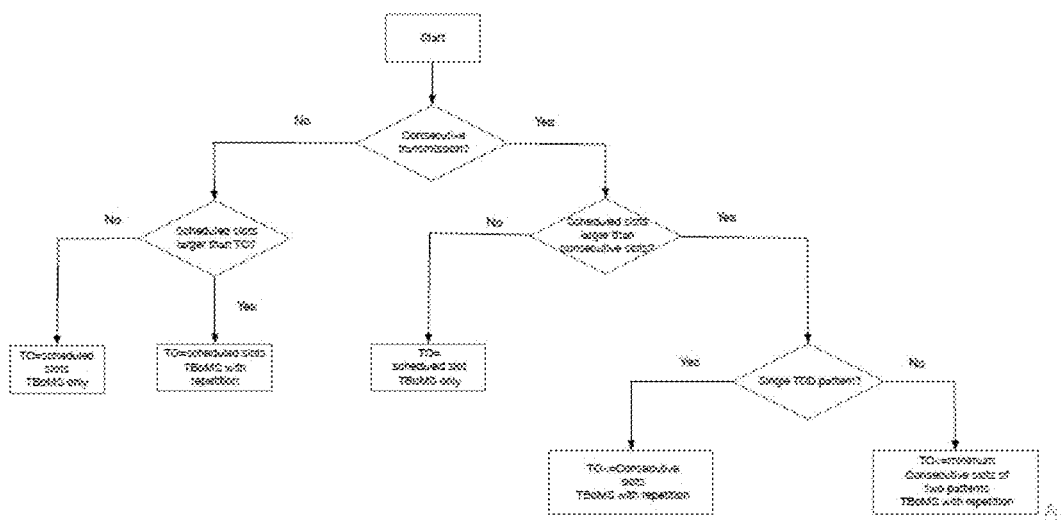
FIG. 11 schematically illustrates a flowchart diagram illustrating an exemplary TMoBS transmission procedure.

FIG. 11 schematically illustrates a flowchart diagram of an exemplary TBoMS transmission, wherein a wireless device, such as a UE, will acquire configuration information for TBoMS and perform the TBoMS transmission based on the information. First, UE is to determine the TBoMS transmission is to be consecutive slot transmission or non-consecutive slot transmission. Then, if non-consecutive slot TBoMS transmission is to be implemented, UE judge the whether the scheduled slots are larger than slots in TO, if no, then it's TBoMS only transmission, otherwise the TBoMS transmission will be re-transmitted with different RV version. If consecutive slot TBoMS transmission is to be implemented, then it is judged whether the scheduled slots are larger than slots in consecutive slots, if the scheduled slot number is smaller or equal to the consecutive slot, it's TBoMS only transmission, otherwise according to the network configuration, for single TDD UL/DL pattern, TO is smaller or equal to consecutive slots, TBoMS will repeat the transmission, such as with different RV version. For dual TDD UL/DL patterns, when TO is smaller than or equal to the minimum consecutive slots, TBoMS will repeat the transmission, or when TO is larger than the minimum consecutive slots, the retransmission may be repeated with appropriate mapping.

Figure 12:
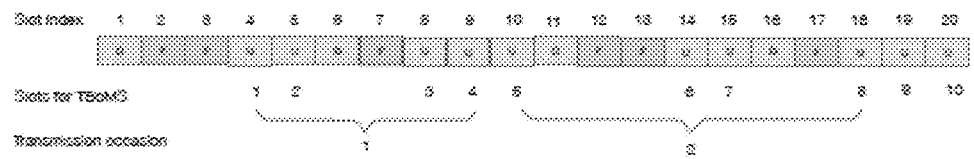
FIG. 12 schematically illustrates some exemplary non-consecutive TBoMS transmission.
Figure 12:
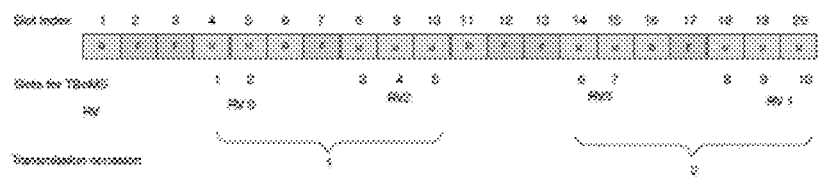
Figure 12:
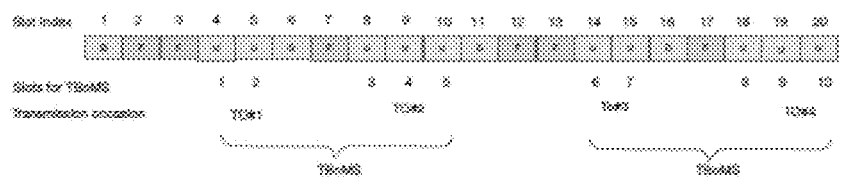

Hereinafter, some examples relate to non-consecutive TBoMS transmission will be described. In an example, the TBS is determined according to the indicated number of slots for TBoMS from one TO, which includes both consecutive UL slots and non-consecutive UL slots. In this example, as shown in FIG. 12(a), a total of 10 slots are assigned to TBoMS transmission. TO1 includes 4 slots, i.e., slot #4, #5, #8, #9, TBS is determined based on REs on four slots; the TO2 repeats the transmission of TO1 with different RV version. For slot #19 and #20, if remaining slots are available for TBoMS transmission, such as, N_TO is 1, then transmission in slot #19 and #20 is dropped; else, such as N_TO is 2, data in slot #4 and #5 are repeated in Slot #19 and #20, since slot #19 and #20 belongs to the first two slots in the remaining slots whose serial numbers correspond to slot #4 and #5 in the first transmission. Different RV is applied for different RO.

In another example, the TO is combined by several consecutive slots, as shown in FIG. 12(b), 2 consecutive slots combined a RO, i.e., slot #4 and #5 plus slot #8, #9 and #10. Different RV is applied to different RO or different RV is applied to different consecutive slots, such as slot #4 and #5 with RV0, Slot #8, #9, #10 with RV2.

In yet another example, the TBS is determined according to the indicated number of slots for TBoMS from several TOs, which includes both consecutive UL slots and non-consecutive UL slots. In this example, as shown in FIG. 12(c), two TOs combines a TBoMS, and all the slots in two TOs are used to determine the TBS. Different RV is applied to different TO, RV 0 2 3 1 corresponding to TO #1, #2, #3, #4 or another alternative, the same RV is applied to TOs in the same TBoMS transmission, different TBoMS transmissions has different RV.

Hereinafter, some examples related to consecutive TBoMS transmission will be described.

For consecutive TBoMS transmission, if the scheduled slot number for TBoMS is larger than the consecutive UL slots, one pattern is configured for UL/DL TDD configuration, and the TO is smaller than or equal to consecutive slots for TBoMS transmission.

Figure 13:
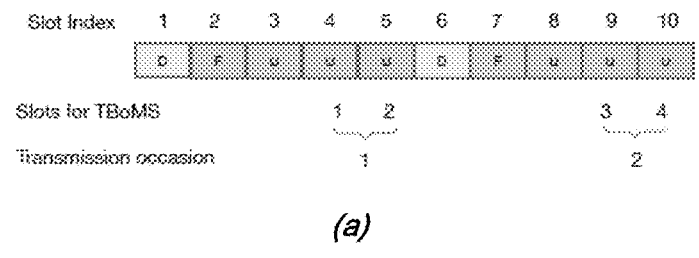
FIG. 13 schematically illustrates some exemplary consecutive TBoMS transmission in case of one pattern configured for UL/DL TDD configuration.
Figure 13:
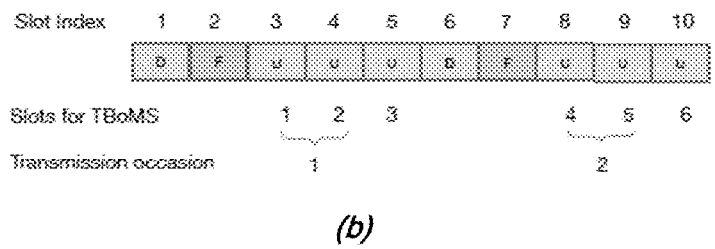

In an example, as shown in FIG. 13(a), 4 slots are assigned for TBoMS transmission, TO=2 slots, N_TO=1, the scheduled slots for TBoMS is 4 slots, and the first available consecutive slots are slot #3, slot #4 and #5. The slot #4 and #5 are Transmission occasion 1 and used to determine the TBS. the transmission occasion 2 just repeat the transmission of transmission occasion 1. The RV version for Transmission occasion 1 can be Version 0, Transmission occasion 2 is version 2, following the RV version {0 2 3 1}. In another example, as shown in FIG. 13(b), 6 slots are assigned for TBoMS transmission, TO=2 slots, the scheduled slots for TBoMS is 6 slots, and the first available consecutive slots are slot #3, slot #4 and #5. The slot #3 and #4 are Transmission occasion 1 and used to determine the TBS. And similarly with above, then remaining slot #5 and #10 can be just ignored and not used for transmission, or can be utilized for re-transmission, where slot #5 could be used for repeat the transmission of slot #3, slot #10 could be used for repeat the transmission of slot #9. That is, the remaining slots will retransmit the slot in the immediately previous TO with the corresponding serial number.

For consecutive TBoMS transmission, if the scheduled slot number for TBoMS is larger than the consecutive UL slots, two patterns are configured for UL/DL TDD configuration. In an example, by default, the TO is equal to the consecutive slots with the minimum slot number in the two patterns, the additional/remaining slot(s) in another TDD pattern could be dropped for transmission or repeat the transmission of the slot in the TO, similarly with that described above.

Figure 14:
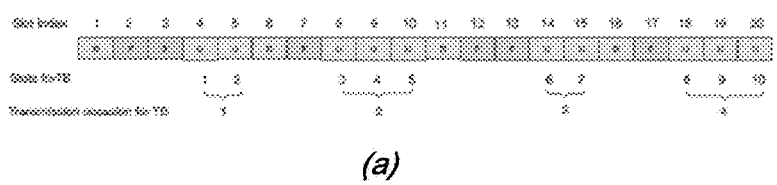
FIG. 14 schematically illustrates some exemplary consecutive TBoMS transmission in case of two patterns configured for UL/DL TDD configuration.
Figure 14:
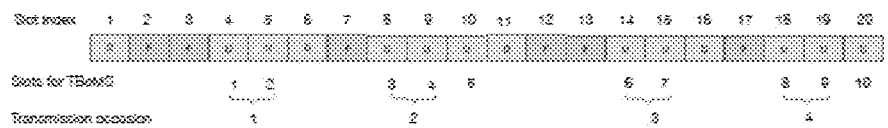

In an example, when TO is equal to the consecutive slots with the minimum slot number in the two patterns, the coded bit of TB can be mapping onto each TOs, and different RV version is applied to each TO. As shown in FIG. 14(a), Pattern 1 is DFFUU, Pattern 2 is DFUUU, 10 slots are assigned for TBoMS transmission, the TO for TBoMS is 2 slots and TBS determine by 2 slots, i.e, by TO #1. The coded bit of TB will be mapped onto each TOs, i.e., TO #1,2,3,4 in the example, different RV version is applied to each TO, such as RV0 for TO #1, RV2 for TO #2, RV 3 for TO #3, RV1 for RO #4. For example, coded bits in TOs with smaller number of slots can be mapped to a TO with larger number of slots with zero padding or information bits of following RV. Another alternative is the coded bit of TB is mapping on to each slot with different RV version. For example, the RV is in the order of 0 2 3 1 0 2 3 1 0 2 for slot 1,2 . . . 10 of slots for TBoMS. In yet another example, when the remaining slots can be utilized for TB transmission, total 10 slots are scheduled for TBoMS, TO=2 slots, And similarly with above, then slot #10 and #20 are not used for transmission, or, slot #10 repeat the slot #3 transmission, slot #20 repeat the transmission of slot #19, as shown in FIG. 14(b).

Figure 15:
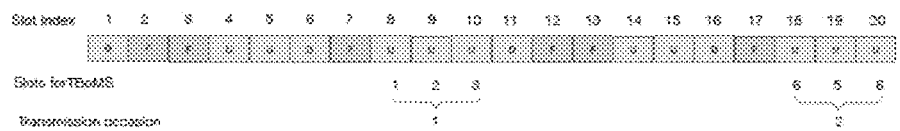
FIG. 15 schematically illustrates some exemplary consecutive TBoMS transmission in case of two patterns configured for UL/DL TDD configuration.
Figure 15:
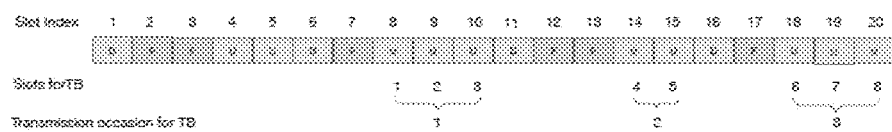

If TO is larger than the consecutive slots with the minimum slot number in the two patterns, the consecutive slots can be skipped, or can be utilized by means of mapping. In an example, as shown in FIG. 15(a), UE skip the transmission on consecutive slots with less slot number, such as slot #14 and slot #15 are skipped in below example, UE jus transmit in TO1 and TO2. In another example, UE perform rate matching to map the coded bits to TO with less slot number, the coding rate is adaptive to the number of slots.

In the below example, the TBS is determined according to TO1, the coded bits of TB are mapped to slot #14 and #15, as shown in FIG. 15(b).

If the scheduled slot number for TBoMS is no larger than the consecutive UL slots, then only one TBoMS transmission will be implemented, and the TBS is determined according to the transmission Occasion (TO), whether remaining slot(s), if any, is used for TBoMS transmission is depending on N_TO setting, in a similar way with that described above.

Figure 16:
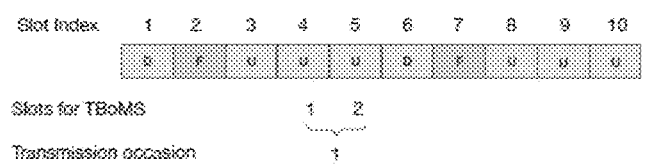
FIG. 16 schematically illustrates some exemplary consecutive TBoMS transmission in case that the scheduled slots are not larger than the consecutive slots.
Figure 16:
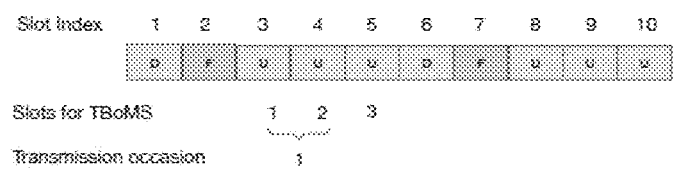

In an example as shown in FIG. 16(a), 2 slots are assigned for TBoMS transmission, TO=2 slots, the scheduled slots for TBoMS is 2 slots. The slot #4 and #5 are transmission occasion 1 and used to determine the TBS. In another example, as shown in FIG. 16(b), 3 slots are assigned for TBoMS transmission, TO=2 slots, the scheduled slots for TBoMS is 3 slots. The slot #3 and #4 are Transmission occasion 1 and used to determine the TBS, and similarly with that described above, the remaining slot #5 can be just ignored and not used for transmission, or can be utilized for re-transmission, for example, slot #5 could be used for repeating the transmission of slot #3.

According to some embodiments of the present disclosure, the configuration information may include information about arrangement of TB content for TBoMS. In particular, the information may relate to arrangement of DMRS pattern for TBoMS.

In an embodiment, DMRS pattern for the TBoMS transmission may be configured according to the repetition type information.

According to an embodiment, when the repetition type information indicates the first repetition type, such as repetition Type A, the DMRS pattern is repeated in each slot according to a specific mapping type. For example, for repetition Type A-like resource allocation, the DMRS pattern is according to configured PUSCH mapping type A or mapping type B. And the pattern is repeated in every slot. According to another embodiment, when the repetition type information indicates the first repetition type and a special slot is available for TBoMR transmission, the DMRS pattern in the special slot is configured as front loaded DMRS. For example, if special slot is supported for TBoMS transmission, the DMRS pattern in special slot is according to PUSCH mapping type B, i.e., the front loaded DMRS.

According to an embodiment, when the repetition type information indicates the second repetition type, such as the repetition type B, the DMRS pattern can be configured in any appropriate manner according to the repetition configuration of the second repetition type. In particular, the DMRS pattern can be configured per slot, can be configured by reusing the repetition DMRS pattern, or can be configured per repetition. According to some embodiments, DMRS pattern is further configured based on the restriction about cross slot boundary transmission.

In an embodiment, the DMRS pattern can be configured per slot mainly based on the repetition configuration of the second repetition type, including at least one of first repetition and actual repetition. and when a special slot is available for TBoMR transmission, the DMRS pattern in the special slot is configured according to the actual repetition of the second repetition type. In particular, the first repetition and actual repetition may be directed to a slot, and the DRMS shall be arranged so that their location in available symbols, such as UL symbols, in each slot shall be the same. For example, in first allocated slot, DMRS pattern is according to the first repetition of repetition type B, in special slot, it is assumed the repetition is re-started. DMRS in special slot is the same as actual repetition in type B repetition, and in other slots, same DMRS pattern as the first repetition of repetition type B can be set, and alternatively, the DMRS pattern can be according to additional gNB configuration, the DMRS pattern is according to PUSCH mapping type A or mapping type B.

Figure 17:
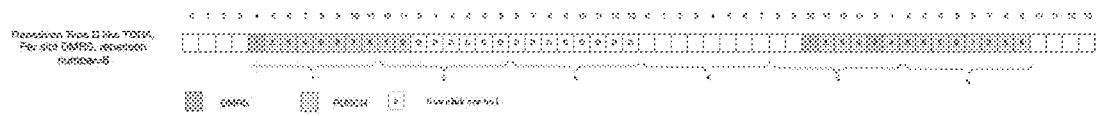
FIG. 17 schematically illustrates some exemplary arrangement of DMRS patterns for TBoMS.
Figure 17:
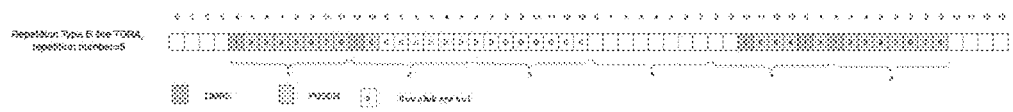
Figure 17:
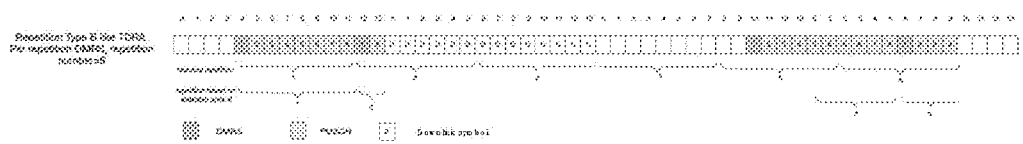

An example is shown in FIG. 17(a), there exist 4 slots, and each slot comprises 14 symbols, as indexed from 0 to 14. The first slot is UL slot, the second slot is DL slot and following a special slot with 4 UL symbols. Type B-like TDRA allocated 8 symbols and starting at symbol 4 for first repetition (here is not real repetition, just copy the concept of repetition type B), nominal repetition number=6; so there are total 24 symbols allocated for TBoMS. The DMRS in the first UL is located in symbol #4 according to first repetition, and according to actual repetition which indicates DMRS shall be located at the first UL symbol in each slot, DMRS in special slot is located in symbol #10, and DMRS in the following UL slot is located in symbol #0.

According to some embodiments, when the repetition type information indicates the second repetition type, such as repetition Type B, the DMRS pattern can be configured by reusing the repetition DMRS pattern, for example, according to at least one of the nominal repetition and actual repetition of the second repetition type. In particular, DMRS shall be arranged so that the relative location of DMRS may be same in available symbols, such as UL symbols, in each nominal repetition. In an embodiment, Reuse Repetition B DMRS pattern, DMRS pattern is the same as the DMRS pattern of PUSCH repetition type B, i.e., the DMRS pattern is determined according to the nominal repetition and actual repetition, and the restriction on no cross slot boundary transmission.

An example is shown in FIG. 17(b), where Type B-like TDRA allocated 8 symbols and starting at symbol 4 for first repetition (here is not real repetition, just copy the concept of repetition type B), nominal repetition number=6; the first slot is UL slot, the second slot is DL slot and following a special slot with 4 UL symbols. So there are total 24 symbols allocated for TBoMS. DMRSs in the first UL are located in symbol #4 and #12 for first nominal repetition and the actual repetition for the second nominal repetition, since symbol #4 and #12 are the first one in respective nominal repetition. In special slot, the DMRS is located in symbol #10 for the first actual repetition of 5th nominal repetition. And in the following UL slot, the first DMRS is in symbol #0 for second actual repetition of 5th nominal repetition. The second DMRS is in symbol #2 for the 6th nominal repetition.

In another embodiment, the DMRS pattern is configured per repetition, and particularly according to repetition of DMRS based on available symbols for TBoMR transmission, wherein DMRS pattern for each repetition is the same as that in the second repetition type.

In an example, the repetition for DMRS is based on available UL symbols for TBoMS transmission. The total symbols for TBoMS is still determined by nominal repetition. -DMRS pattern for each repetition (based on available symbol) is the same as the DMRS configuration in the repetition type B. The repetition (based on available symbol) can be across the slot boundary, the special slot is not counting into the repetition (i.e., special slot is handling specially). In special slot, it is assumed the repetition is re-started. DMRS in special slot is the same as actual repetition in type B repetition. An example is shown in FIG. 17(c), wherein Type B-like TDRA allocated 8 symbols and starting at symbol 4 for first repetition (here is not real repetition, just copy the concept of repetition type B), nominal repetition number=6; the first slot is UL slot, the second slot is DL slot and following a special slot with 4 UL symbols. So there are total 24 symbols allocated for TBoMS. There are 3 repetitions, which is based on the available UL symbols, so there are 3 DMRSs in sybmol #4, #12 and #6. And another DMRS in #10 for special slot.

Reliability Enhancement for TB Transmission Over Multi-Slot

Traditionally, one TB (transmission block) is transmitted on single slot, now one TB is transmitted over several slots, the coded bits are distributed in multiple slots. However, if the data in one slot is not correctly decoded, then the whole TB would need to be retransmitted. In view of this, the present disclosure provides some solutions to improve the reception reliability for multi-slot encoding so as to improve reliability for TBoMS.

In an embodiment, the TBoMS can be combined with repetition. In an example, repetition can be utilized in re-transmission as supplementary for TBoMS, as indicated in the configuration information described above. In another example, gNB can configure the number of slots for TB joint coding (or joint coding window), and configures the total number of slots for TB transmission. Then UE can judge whether repetition will be performed based on comparison between such two number configurations. If two configurations have the same slot number or total slot number is not configured, then no repetition is expected by the UE, otherwise, repetition may be expected by the UE. For example, when the number of time-domain resources for TB joint coding is larger than the total number of time-domain resources for TB transmission, the TB transmission can be repeated.

Figure 18:
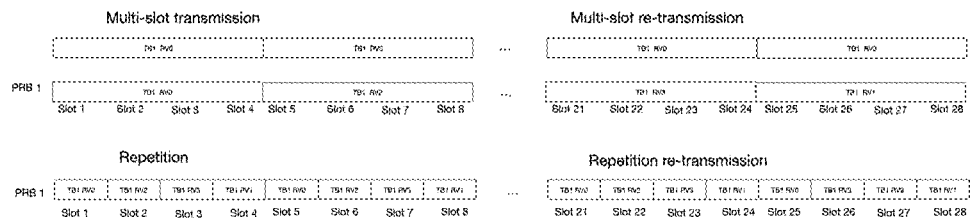
FIG. 18 schematically illustrates some exemplary reliability enhancement procedures for TBoMS, wherein (a) illustrates combination of TBoMS and repetition, (b) illustrates joint coding, and (c) illustrates power adjustment.
Figure 18:
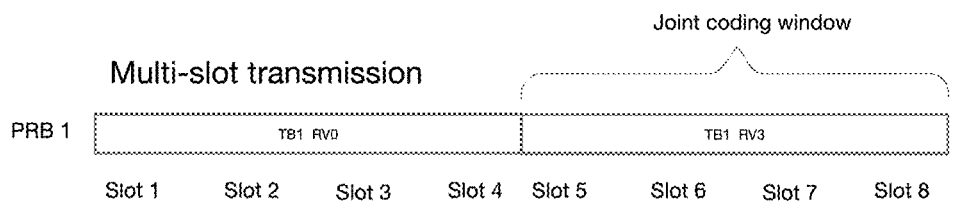
Figure 18:
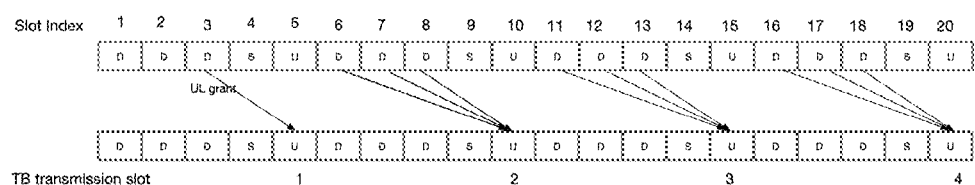

In an example, as shown in FIG. 18 (a), TB1 is joint coding over 4 slots, the gNB configures the total slot for TB transmission is 8 slots, thus the TB1 repeats the transmission twice. The Redundancy version for TB transmission is configurable and based on joint coding slots. In an example, Redundancy Version (RV) for TB transmission repetition can be configured based on a threshold for joint coding time-domain resources. For example, Redundancy version can be configured between {0, 2,3,1} and {0, 3} for TB transmission repetition. A threshold is defined for joint coding slot, such as if the joint coding slot is larger 8 slot, then only RV {0, 3} is allowed, due to the fact, RV0 and RV3 are self-decodable, which could avoid unnecessary retransmission. For re-transmission, the RV can be indicated in the DCI with configured within configured RV set {0,2,3,1} or {0,3}.

In an embodiment, the TBoMS can be combined with cross-slot channel estimation. In particular, the configuration information includes information indicating whether cross-slot channel estimation is to be performed, and wherein the wireless device is further configured to perform the cross-slot channel estimation for TBoMR based on a cross-slot channel estimation window or a joint coding window when the information indicates the cross-slot channel estimation is to be performed, as shown in FIG. 18(b).

In an example, if the gNB informs the capable UE with cross-slot channel estimation, a cross-slot channel estimation window can be configured to UE, if it is not configured, UE would assume the joint coding window is used for cross-slot channel estimation. In the joint channel estimation window, UE would keep the transmission power unchanged, and timing advance unchanged. For this, the TPC command may be only applied to next cross-slot channel estimation window, or the TPC command may be applied to next TB transmission, for example.

In the joint channel estimation window, the phase continuity would be continuous between the PUSCH and the corresponding DMRS symbol when DMRS is shared among slots for joint channel estimation. For this, in an example, UE don't expect the other transmission during the cross-slot channel estimation window, such as the PUCCH, SRS, the transmission of these channels/signals is dropped. In another example, the whole symbols in the slot are fully occupied by the TB transmission.

Fallback from cross-slot channel estimation. If the phase continuity could not kept or the transmission power changes, gNB falls back to perform single slot channel estimation, due to the TB transmission is overlapping with other high priority UL transmission.

In an embodiment, the TBoMS can be combined with frequency hopping. To improve the reception reliability, frequency hopping can be enabled for multi-slot transmission. In an example, the frequency domain resource allocation (FDRA) is applied to all slots for TB transmission.

Information about whether Frequency hopping is to be performed can be indicated in any appropriate manner. For example, Frequency hopping can be enabled/disabled by RRC signaling. According to an embodiment, the configuration information includes information indicating whether frequency hopping is enabled for TBoMR, and wherein the wireless device is further configured to perform the frequency hopping for TBoMR in an appropriate frequency hopping granularity when the information indicates the frequency hopping is enabled.

Frequency hopping can be performed in any appropriate granularity. In an example, Per-slot frequency hopping. In another example, Per Multi-slot frequency hopping, the number of slot in one hop is configurable. For example, first hop in slot 1, 2; second hop in slot 3, 4. In yet another example, per joint coding window hopping, the number of slot in one hop is the same as the slots in the joint coding window.

According to an embodiment, the Frequency hopping can be in conjunction with cross-slot channel estimation. In an example, combining with the per multi-slot frequency hopping, in each hop, the joint channel estimation is performed among the DMRS in the slots, the hopping can be per joint coding window, or cross channel estimation window In an embodiment, the TBoMS can be combined with power control. In particular, the wireless device can perform transmission power adjustment for TBoMR transmission by using a specific time-domain resource level offset value.

More specifically, to improve the reception reliability, the power control for repetition and TB transmission over multi-slot can be improved. Issues for current power control, the TPC commands are accumulated between two UL grants for PUSCH. However if the same mechanism is simply reused for repetition and multi-slot transmission, one UL grant will schedule a PUSCH in multi-PUSCH transmission occasions. The transmission power will be kept the same in all slots for TB transmission. Until next TB transmission, the UL power will update according to the TPC command. The power adjustment is slow. With respect to this, there provides some solutions.

In an embodiment, a symbol level or slot level offset is defined, the TPC commands after the last UL slot transmission to the slot before the offset will apply to adjust the transmission power for current slot. The offset value can be indicated in any appropriate manner. In an example, the offset value can be reported by UE, according to UE processing capability. In another example, the offset value is fixed in the specification, such as 14 symbols. In yet another example, gNB indicates the offset value via higher layer signaling.

In another embodiment, the TPC command in the UL grant can be applied to all the slots for TB transmission.

In an example, as shown in FIG. 18(*c*), the TB will transmit over four slots, i.e., slot 5, 10, 15 and 20, the UL grant for this TB is transmitted in slot 3. The TPC command in slot 3 will apply to all 4 slots for proposal 2. For the embodiment related to symbol level or slot level offset, it only apply to slot 5, and TPC commands in slot 6, 7, 8 are applied to slot 10, TPC commands in slot 11, 12, 13 are applied to slot 15, TPC commands in slot 16, 17, 18 are applied to slot 20.

According to an embodiment, the TBoMS transmission will be performed in consideration of possible overlapping with other channel signal. In particular, the wireless device is further configured to when the TBoMR transmission overlaps with other types of information transmission, perform TBoMR transmission based on a priority relationship therebetween or a specific cancellation rule.

For example, when TB over multi-slots transmission is overlapping with HARQ-ACK, SR, CSI, SRS, CG, other PUSCH, priority rule is defined. The priority rule can be defined appropriately. For example, the priority rule may be: HARQ-ACK>Positive SR >PUSCH>P/SP-CSI on PUCCH>SRS. The PUSCH channel priority: high priority PUSCH>SPS>PUSCH over multi-slot, and the PUSCH channels priority may be indicated by gNB. And the processing can be performed based on such priority rule.

In an example, if the processing time is allowed, UCI is multiplexing on PUSCH with multi-slot transmission; otherwise if the processing time is not enough, the low priority channel is dropped. In another example, the low priority channel is simply dropped, without considering other factors. In yet another example, for PUSCH over multi-slot dropping, only the PUSCH on colliding slot is dropped, or the whole TB transmission is dropped. In still another example, the UE is configured with CI-RNT and detect the DCI format 2_4 with CI-RNTI, UE cancels the TB transmission according to the cancellation indication in the DCI.

FIGS. 8-18 illustrate further aspects that might be used in conjunction with the method of FIGS. 7A and 7B if desired. It should be noted, however, that the exemplary details illustrated in and described with respect to FIGS. 8-18 are not intended to be limiting to the disclosure as a whole: numerous variations and alternatives to the details provided herein below are possible and should be considered within the scope of the disclosure.

Note that the above description is mainly based on examples related to PUSCH, but such solutions of the present disclosure can be equivalent to other types of communication, such as PDSCH, and so on, and the above solutions can be implemented by the corresponding device and can achieve the similar advantageous effects. For example, in a case of TBoMS transmission for PDSCH, the above processes can be implemented by a network-side device, such as a base station or its associated device.

In the following further exemplary embodiments are provided.

One set of embodiments may include a wireless device, comprising: at least one antenna; at least one radio coupled to the at least one antenna; and a processor coupled to the at least one radio; wherein the wireless device is configured to acquire configuration information about Transmission Block over Multiple time-domain Resources (TBoMR); and perform at least TBoMR transmission over time domain resources based on the configuration information.

According to some embodiments, the configuration information can include the information to determine the transmission Block Size (TBS), wherein the TBS can be determined based on the number of time-domain resources in one or more Transmission Occasions (TOs) for the TBoMR transmission, and the wireless device can be further configured to perform the TBoMR transmission over at least time-domain resources allocated based on the TBS information.

According to some embodiments, the Transmission Occasion (TO) can include at least one of consecutive time-domain resources and non-consecutive time-domain resources included in time-domain resources scheduled for the TBoMR transmission.

According to some embodiments, the TBS can be determined based on Physical Resource Block (PRB) limit or TBS limitation, and the wireless device can be further configured to perform the TBoMR transmission over at least time-domain resources allocated based on the determined TBS.

According to some embodiments, the configuration information can further include information about repetition type of Time Domain Resource Allocation (TDRA) for TBoMR transmission, and the wireless device can be further configured to perform the TBoMR transmission over time-domain resources allocated according to the repetition type.

According to some embodiments, when the repetition type information indicates a first repetition type, and the time-domain resource allocation can be based on at least one of the following:
the number of allocated symbols is the same in each slot as the time-domain resource,
all consecutive slots serve as the time-domain sources for the TBoMR transmission; and
all available slots serve as the time-domain sources for repetition in the TBoMR transmission.

According to some embodiments, when the repetition type information indicates a second repetition type, and the time-domain resource allocation can be based on at least one of the following:
the number of allocated symbols is different in each slot as the time-domain resource,
all consecutive slots serve as the time-domain sources for the TBoMR transmission; and
all available symbols serve as the time-domain sources for repetition in the TBoMR transmission.

According to some embodiments, the configuration information can further include information indicating whether a special time-domain resource is available for the TBoMR transmission, and the wireless device can be further configured to perform the TBoMR transmission over the special time-domain resource when the information indicates the special time-domain resource is available.

According to some embodiments, the configuration information can include transmission mode information indicating the transmission mode of first TBoMS transmission, and wherein the wireless device can be further configured to perform the first TBoMS transmission according to the transmission mode indicated by the transmission mode information.

According to some embodiments, the configuration information can include information indicating whether re-transmission is enabled for TBoMS transmission or not implicitly or explicitly, and wherein the wireless device can be further configured to: when the re-transmission is enabled, perform the re-transmission of the first TBoMS transmission.

According to some embodiments, whether the re-transmission is performed can be indicated by counts of Tos, and when there exist two or more Tos are available for the TboMR transmission, the re-transmission is performed.

According to some embodiments, the configuration information can include TO count information about the counts of Tos available for the TboMR transmission, and the wireless device can be further configured to perform the TboMR transmission over at least time-domain resources included in time-domain resources scheduled for the TboMR transmission allocated based on the count of Tos.

According to some embodiments, the configuration information can include information about the time-domain resources scheduled for the TboMR transmission, and the count of Tos is determined based on the number of scheduled time-domain resources and the number of time-domain resources in a TO.

According to some embodiments, the configuration information can include information about consecutive time-domain resources included in the time-domain resources scheduled for the TboMR transmission, and wherein the count of Tos can be determined based on the number of consecutive time-domain resources and the number of time-domain resources in a TO.

According to some embodiments, the configuration information can include information about the number of sets of consecutive time-domain resources and the number of time-domain resources in each set, and wherein the count of Tos can be determined by rounding the ratio of the number of time-domain resources in each set and the number of time-domain resources in a TO and summing the rounded ratios.

According to some embodiments, the configuration information can include information about the number of sets of consecutive time-domain resources and the number of time-domain resources in each set, and wherein the number of Tos corresponds to the number of sets of consecutive time-domain resources, and the wireless device can be further configured to perform the TboMR transmission by rate mapping of coded bits of TBs into any set of consecutive time-domain resources whose number is different from the number of time-domain resources in the TO.

According to some embodiments, the configuration information can include re-transmission mode information indicating the retransmission mode of subsequent TboMS transmission, and wherein the wireless device can be further configured to perform the subsequent TboMS transmission according to the re-transmission mode indicated by the re-transmission mode information.

According to some embodiments, the retransmission mode may be different from the transmission mode for the first TboMS transmission or the transmission mode for the immediately previous TboMS transmission.

According to some embodiments, the retransmission mode may be the same as the transmission mode for the first TboMS transmission, and wherein the wireless device can be further configured to repeat the TB transmission in the first TO in the subsequent Tos with corresponding Redundancy Versions (RV) in accordance with a specific RV sequence.

According to some embodiments, the configuration information can include information indicating whether remaining time-domain resources includes in time-domain resources scheduled for the TboMR transmission other than the TO are available for the TboMR transmission, and the wireless device can be further configured to when the remaining time-domain resources are available, perform TboMR re-transmission by utilizing the remaining time-domain resources to repeat the transmission of TB in previous specific time-domain resources.

According to some embodiments, the remaining time-domain resources may include remaining time-domain resources in a set of consecutive time-domain resources other than the TO.

According to some embodiments, when the information indicates the remaining time-domain resources are not available for the TboMR transmission, the remaining time-domain resources can be ignored and not used for transmission of TB.

According to some embodiments, the configuration information may include information about repetition type of Time Domain Resource Allocation (TDRA) for TboMR transmission, and the wireless device can be further configured to arrange DMRS pattern for the TboMS transmission according to the repetition type information.

According to some embodiments, when the repetition type information indicates a first repetition type, the DMRS pattern can be repeated in each slot according to a specific mapping type.

According to some embodiments, when the repetition type information indicates the first repetition type and a special slot is available for TboMR transmission, the DMRS pattern in the special slot is configured as front loaded DMRS.

According to some embodiments, wherein when the repetition type information indicates a second repetition type, the DMRS pattern can be arranged per slot according to the repetition configuration of the second repetition type, wherein the repetition configuration includes at least one of first repetition or actual repetition of the second repetition type.

According to some embodiments, when the repetition type information indicates the second repetition type, the DMRS pattern can be arranged based on reusing repetition according to at least one of the nominal repetition and actual repetition of the second repetition type.

According to some embodiments, when the repetition type information indicates the second repetition type, the DMRS pattern can be arranged per repetition according to repetition of DMRS based on available symbols for TboMR transmission, wherein DMRS pattern for each repetition is the same as that in the second repetition type.

According to some embodiments, when a special slot is available for TboMR transmission, the DMRS pattern in the special slot can be configured according to the actual repetition of the second repetition type.

According to some embodiments, DMRS pattern can be further arranged based on the restriction about cross slot boundary transmission.

According to some embodiments, the wireless device can be further configured to compare the number of time-domain resources for TB joint coding and the total number of time-domain resources for TB transmission; and perform the TBoMR transmission by re-transmission when the number of time-domain resources for TB joint coding is larger than the total number of time-domain resources for TB transmission.

According to some embodiments, the wireless device can be further configured to determine Redundancy Version (RV) for TboMS re-transmission based on a threshold for joint coding time-domain resources.

According to some embodiments, the configuration information may include information indicating whether cross-slot channel estimation is to be performed, and wherein the wireless device can be further configured to perform the cross-slot channel estimation for TboMR based on a cross-slot channel estimation window or a joint coding window when the information indicates the cross-slot channel estimation is to be performed, and where the channel estimation window(s) can be implicitly derived from TDD UL-DL configuration or explicitly configured.

According to some embodiments, the configuration information may include information indicating whether frequency hopping is enabled for TboMR, and wherein the wireless device is further configured to perform the frequency hopping for TboMR in an appropriate frequency hopping granularity when the information indicates the frequency hopping is enabled.

According to some embodiments, the wireless device can be further configured to perform transmission power adjustment for TBoMR transmission by using a specific time-domain resource level offset value or the transmission is kept the same during the TBoMR transmission.

According to some embodiments, the wireless device can be further configured to, when the TBoMR transmission overlaps with other types of information transmission, perform TBoMR transmission based on a priority relationship therebetween or a specific cancellation rule.

Yet another set of embodiments may include an apparatus, comprising: a processor configured to cause a wireless device to acquire configuration information about Transmission Block over Multiple time-domain Resources (TBoMR); and perform at least TBoMR transmission over time domain resources based on the configuration information According to some embodiments, the processor can cause the wireless device to implement any or all parts of any of the preceding embodiments/examples.

Yet another set of embodiments may include a network-side device, comprising: at least one antenna; at least one radio coupled to the at least one antenna; and a processor coupled to the at least one radio; wherein the network-side device can be configured to provide configuration information about Transmission Block over Multiple time-domain Resources (TBoMR); and receive at least TBoMR transmission over time domain resources based on the configuration information.

Yet another set of embodiments may include an apparatus, comprising: a processor configured to cause a network-side device to provides configuration information about Transmission Block over Multiple time-domain Resources (TBoMR); and receive at least TBoMR transmission over time domain resources based on the configuration information.

According to some embodiments, the processor can cause the network side device to implement any or all parts of any of the preceding embodiments/examples.

Yet another set of embodiments may include a method for a wireless device, comprising acquiring configuration information about Transmission Block over Multiple time-domain Resources (TBoMR); and performing at least TBoMR transmission over time domain resources based on the configuration information According to some embodiments, the method can be further performed by the wireless device to implement any or all parts of any of the preceding embodiments/examples.

Yet another set of embodiments may include a method for a network-side device, comprising: providing configuration information about Transmission Block over Multiple time-domain Resources (TBoMR); and receiving at least TBoMR transmission over time domain resources based on the configuration information.

According to some embodiments, the method can be further performed by the network side device to implement any or all parts of any of the preceding embodiments/examples.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising by a device: performing any or all parts of the preceding examples.

A yet further exemplary embodiment may include a non-transitory computer accessible memory medium comprising program instructions which, when executed at a device, cause the device to implement any or all parts of any of the preceding examples.

A yet further exemplary embodiment may include a device comprising: a processor, and a computer-readable storage medium, having program instructions stored thereon, which, when executed, cause the device to implement any or all parts of any of the preceding examples.

A still further exemplary embodiment may include a computer program product comprising instructions for performing any or all parts of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio coupled to the at least one antenna; and
a processor coupled to the at least one radio;
wherein the wireless device is configured to:
acquire configuration information about Transmission Block over Multiple time-domain Resources (TBoMR);
determine a transmission block size (TBS) based on a number of slots for Transmission Block over Multiple Slot (TBoMS) transmission from a plurality of transmission occasions (TOs), wherein the number of slots comprises both consecutive uplink (UL) slots and non-consecutive UL slots; and
perform at least TBoMR transmission over time-domain resources based on the configuration information, wherein the time-domain resources are allocated based on the determined TBS.

2. The wireless device of claim 1, wherein the configuration information further includes repetition type information about Time Domain Resource Allocation (TDRA) for the TBoMR transmission, and the wireless device is configured to:
perform the TBoMR transmission over the time-domain resources allocated according to the repetition type information.

3. The wireless device of claim 2, wherein when the repetition type information indicates a first repetition type, and the time-domain resource allocation is based on at least one of the following:
a number of allocated symbols is the same in each slot as the time-domain resource,
all consecutive slots serve as the time-domain resources for the TBoMR transmission; and
all available slots serve as the time-domain resources for repetition in the TBoMR transmission.

4. The wireless device of claim 3, wherein when the repetition type information indicates a second repetition type, and the time-domain resource allocation is based on at least one of the following:
the number of allocated symbols is different in each slot as the time-domain resource,
all consecutive slots serve as the time-domain resources for the TBoMR transmission; and
all available symbols serve as the time-domain resources for repetition in the TBoMR transmission.

5. The wireless device of claim 1, wherein the configuration information further include information indicating whether a special time-domain resource is available for the TBoMR transmission, and the wireless device is configured to:
perform the TBoMR transmission over the special time-domain resource when the information indicates the special time-domain resource is available.

6. The wireless device of claim 1, wherein the configuration information includes transmission mode information indicating the transmission mode of first TBoMS transmission, and
wherein the wireless device is further configured to:
perform the first TBoMS transmission according to the transmission mode indicated by the transmission mode information.

7. The wireless device of claim 1, wherein the configuration information includes information indicating whether re-transmission is enabled for TBoMS transmission or not implicitly or explicitly, and
wherein the wireless device is further configured to: when the re-transmission is enabled, perform a re-transmission of a first TBoMS transmission.

8. A method for a user equipment (UE), comprising:
acquiring configuration information about Transmission Block over Multiple time-domain Resources (TBoMR);
determining a transmission block size (TBS) based on a number of slots for Transmission Block over Multiple Slot (TBoMS) transmission from a plurality of transmission occasions (TOs), wherein the number of slots comprises both consecutive uplink (UL) slots and non-consecutive UL slots; and
performing at least TBoMR transmission over time-domain resources based on the configuration information, wherein the time-domain resources are allocated based on the determined TBS.

9. The method of claim 8, wherein the configuration information further includes repetition type information about Time Domain Resource Allocation (TDRA) for the TBoMR transmission, and the method further comprising:
performing the TBoMR transmission over the time-domain resources allocated according to the repetition type information.

10. The method of claim 9, wherein when the repetition type information indicates a first repetition type, and the time-domain resource allocation is based on at least one of the following:
a number of allocated symbols is the same in each slot as the time-domain resource,
all consecutive slots serve as the time-domain resources for the TBoMR transmission; and
all available slots serve as the time-domain resources for repetition in the TBoMR transmission.

11. The method of claim 10, wherein when the repetition type information indicates a second repetition type, and the time-domain resource allocation is based on at least one of the following:
the number of allocated symbols is different in each slot as the time-domain resource,
all consecutive slots serve as the time-domain resources for the TBoMR transmission; and
all available symbols serve as the time-domain resources for repetition in the TBoMR transmission.

12. The method of claim 8, wherein the configuration information further includes information indicating whether a special time-domain resource is available for the TBoMR transmission, and the method further comprising:
performing the TBoMR transmission over the special time-domain resource when the information indicates the special time-domain resource is available.

13. The method of claim 8, wherein the configuration information includes transmission mode information indicating the transmission mode of first TBoMS transmission, and
wherein the method further comprises: performing the first TBoMS transmission according to the transmission mode indicated by the transmission mode information.

14. The method of claim 8, wherein the configuration information includes information indicating whether re-transmission is enabled for TBoMS transmission or not implicitly or explicitly, and
wherein the method further comprises: when the re-transmission is enabled, performing a re-transmission of a first TBoMS transmission.

* * * * *